United States Patent [19]

MacGregor

[11] 3,960,549

[45] June 1, 1976

[54] PROCESS FOR THE SEPARATION AND PURIFICATION OF PLATINUM, RHODIUM AND IRIDIUM

[75] Inventor: John James MacGregor, London, England

[73] Assignee: Matthey Rustenburg Refiners (Proprietary), Limited, Johannesburg, South Africa

[22] Filed: Dec. 3, 1974

[21] Appl. No.: 529,245

[30] Foreign Application Priority Data

Dec. 7, 1973 United Kingdom............... 56826/73

[52] U.S. Cl............................... 75/108; 75/101 BE; 75/121; 423/22; 423/463
[51] Int. Cl.²................... C22B 11/04; C01G 55/00
[58] Field of Search................ 75/101 BE, 108, 121, 75/97 R; 423/22

[56] References Cited
UNITED STATES PATENTS

| | | | |
|---|---|---|---|
| 3,001,868 | 9/1961 | Aveston et al.......................... | 423/22 |
| 3,024,084 | 3/1962 | Raper et al............................ | 423/22 |
| 3,437,431 | 4/1969 | Platz et al............................. | 423/22 |
| 3,787,554 | 1/1974 | Ziegler................................. | 423/22 |

OTHER PUBLICATIONS

Dolgikh et al., "Chemical Absts.," vol. 65, 1966 11423c.

Primary Examiner—Herbert T. Carter
Attorney, Agent, or Firm—Cushman, Darby & Cushman

[57] ABSTRACT

This invention relates to a process for the separation and purification of platinum group metals and particularly platinum, rhodium and iridium. Essentially the platinum group metals are present as salts dissolved in an aqueous solution and the process for separating and purifying the platinum group metals comprises, according to one embodiment of the invention, the following steps:

a. adjusting the pH, as necessary, to provide an acidic solution;
b. contacting the acidic solution with a reducing agent to effect the reduction of iridium, that is, Ir(IV) to Ir(III);
c. contacting the reduced solution with a nitrogen containing or organic compound selected from the group consisting of secondary amines, tertiary amines, and quaternary ammonium compounds;
d. removing from contact with the solution an organic phase containing substantially all of the platinum present in association with the nitrogen-containing organic compound used in step (c);
e. re-oxidising iridium which (with rhodium) remains in the aqueous phase from Ir(III) to Ir(IV);
f. again contacting the oxidised solution with a fresh quantity of a nitrogen-containing organic compound selected from the group consisting of secondary amines, tertiary amines, and quaternary ammonium compounds; and
g. removing from contact with the re-oxidised solution the organic phase containing substantially all of the iridium present in association with the nitrogen-containing organic compound used in step (f).

49 Claims, No Drawings

3,960,549

PROCESS FOR THE SEPARATION AND PURIFICATION OF PLATINUM, RHODIUM AND IRIDIUM

This invention relates to the separation and purification of the platinum group metals; more particularly it relates to separation of mixtures of rhodium, platinum and iridium.

In processes for the recovery and separation of the platinum metals from mineral deposits it is frequently necessary to separate and purify platinum, iridium and rhodium from aqueous solutions containing salts of all three together with small quantities of dissolved base metals such as iron, copper, nickel, tin and selenium present to the extent of up to 5% by weight.

It is an object of the present invention to obtain in large yield platinum, rhodium and iridium having a high degree of purity and thus to separate the said platinum metals from each other and also to purify them from any base metal which may be present.

According to one aspect of the present invention a process for the separation and purification of platinum, rhodium and iridium present as salts dissolved in aqueous solution comprises the steps of:

a. adjusting the pH as necessary to provide an acidic solution,
b. contacting the acidic solution with a reducing agent to effect the reduction of iridium i.e. Ir(IV) to IR(III),
c. contacting the reduced solution with a nitrogen containing organic compound selected from the group consisting of secondary amines, tertiary amines and quaternary ammonium compounds,
d. removing from contact with the solution an organic phase containing substantially all of the platinum present in association with the nitrogen-containing organic compound used in step (c),
e. re-oxidising iridium which (with rhodium) remains in the aqueous phase from Ir(III) to Ir(IV),
f. again contacting the oxidised solution with a fresh quantity of a nitrogen-containing organic compound selected from the group consisting of secondary amines, tertiary amines and quaternary ammonium compounds,
g. removing from contact with the re-oxidised solution the organic phase containing substantially all of the iridium present in association with the nitrogen-containing organic compound used in step (f).

The nitrogen containing organic compound used in step (f) is preferably the same as that used in step (c) and is preferably a tertiary amine of general formula $R_3N$ in which R is $C_6$–$C_{12}$ alkyl with normal $C_8$ predominating. In step (c) and step (f) nitrogen containing organic compound is preferably equilibrated with an acid preferably hydrochloric acid, before contacting with the acidified solution.

According to another aspect of the present invention a process for the separation of salts of platinum, rhodium and iridium in aqueous solution comprises the steps of:

a. acidifying the solution;
b. contacting the acidified solution with a reducing agent to effect the reduction of Ir(IV) to Ir(III);
c. contacting the solution with a tertiary amine $R_3N$ equilibrated with hydrochloric acid in which R is $C_8$–$C_{10}$ alkyl with normal $C_8$ predominating;
d. removing from contact with the solution an organic phase containing subtantially all of the platinum present in association with the tertiary amine;
e. re-oxidising the iridium which (with rhodium) remains in the aqueous phase to Ir(IV);
f. again contacting the oxidised solution with a fresh quantity of the above-mentioned tertiary amine $R_3N$ in which R is $C_8$–$C_{10}$ alkyl with normal $C_8$ predominating, and
g. removing from contact with the re-oxidised solution the organic phase containing substantially all of the iridium present in association with the said tertiary amine.

If the aqueous solution is not already at the required pH, it is preferably acidified at stage (a) with hydrochloric acid to establish a hydrochloric acid strength within the range 3–9 molar, preferably about 6 molar.

Preferably the reduction in stage (b) is carried out with conventional reducing agents such as sulphite, sulphur dioxide, hydrazine, ketones such as acetone, oxalate, aldehydes e.g. formaldehyde, alcohols, preferably primary alcohols such as ethanol, formates and hydrogen.

Known techniques may be used for ensuring adequate contact of the nitrogen-containing organic compound with aqueous solution as described in steps (c) and (f) above in both aspects of the invention. If the operation is being carried out on a large scale, a multistage counter-current extraction assembly may be used. Alternatively, the two phases may be vigorously agitated together by shaking, stirring etc.

Secondary amines which may be used in steps (c) and (f) above (in the first aspect of the invention) are preferably those of the type $R_2NH$ where R is aliphatic. Preferred R groups are normal alkyl ranging from $C_6$ to $C_{12}$. Iso-alkyl groups may also be used, however, and R may therefore by selected from the group comprising the normal-and-iso-isomers of hexyl, heptyl, octyl, nonyl, decyl, undecyl and dodecyl alkyl groups.

Examples of commercially available secondary amines which may be used are:

a. N-dodecyl (trialkylmethyl) amine (Amberlite LA 1 (Registered Trade Mark); a secondary amine supplied by Rohm & Haas having a molecular weight within the range 351–393);
b. N-lauryl (trialkylmethyl) amine (lauryl = dodecyl) Amberlite LA 2 (Registered Trade Mark); a secondary amine supplied by Rohm & Haas having a molecular weight within the range 353–395);
c. Amine 9D – 178 (a secondary amine mixture);
d. Armeens (Registered Trade Mark) and Ethomeens (Registered Trade Mark) supplied by Armour - Hess Chemicals.

Tertiary amines which may be used in steps (c) and (f) above (in both aspects of the invention) are preferably those of the type $R_3N$ where R is aliphatic. Preferred R groups are normal alkyl ranging from $C_6$–$C_{12}$. Iso-alkyl groups may also be used, however, and R may therefore be selected from the group comprising the normal and iso isomers of hexyl, heptyl, octyl, nonyl, decyl, undecyl and dodecyl alkyl groups.

Examples of tertiary amines which may be used are
tri-n-hexylamine
methyldi-n-octylamine
tri-n-octylamine
tri-iso-octylamine
tri-n-heptylamine
tri-iso-heptylamine tri-n-nonylamine
tri-iso-nonylamine Aromatic and mixed aliphatic and aromatic R groups may also be used for the tertiary amine and quaternary ammonium compounds. Examples of tertiary amines and quaternary ammonium compounds are:

triphenylamine
tribenzylamine
diphenyl methylamine
phenyl trimethyl ammonium hydroxide
dimethyl benzylamine
dimethyloctyl benzyl ammonium chloride
tetraoctyl ammonium chloride Examples of commercially available tertiary amines and quaternary ammonium compounds which can be used are:

a. Arquad 2HT (Registered Trade Mark); a dimethyl dioctadecyl quaternary ammonium chloride;
b. Ethomeens (Registered trade mark) for tertiary amines and quaternary ammonium compounds, mostly water insoluble, supplied by Armour - Hess.
c. Adogens (Registered trade mark; supplied by Ashland Chemicals) Andogen 364 Tri-n-alkylamine, predominantly C9 Adogen 381 Tri-iso octylamine
d. Alamines (Registered Trade Mark; tertiary amines supplied by General Mills) Alamine 336 Tricaprylamine, predominantly $C_8 - C_{10}$ (capryl = octyl) Alamine 308
e. Aliquats (Registered Trade Mark) quaternary ammonium compounds supplied by General Mills: Aliquat 336 methyl tri-n-alkylammonium chloride; a quaternary having predominantly $C_8$–$C_{10}$ normal alkyl groups.

At stage (d) the organic phase containing substantially all of the platinum present in association with the nitrogen-containing organic compound used in stage (c) is normally removed by physical methods as the phase separation is quite distinct. Either acid or alkali may be used as the reagent for stripping the platinum from the nitrogen containing organic compound. Strong acids such as hydrochloric acid, nitric acid or perchloric acid may be used. Examples of alkalis which may be used as the stripping reagent are lithium, potassium and sodium hydroxide solutions, ammonium hydroxide solution and potassium and sodium carbonate and bicarbonate solutions. Moderately strong aqueous alkali solutions are preferred e.g. 5–20% by weight.

Base metals may or may not be further removed by hydrolysis at this stage depending upon the purity of platinum required. The platinum present is then reduced to the metal by hydrazine or by hydrogen under pressure.

At stage (e) any loss of acidity caused by contact with an organic base is preferably restored. The iridium may then be re-oxidised with a variety of oxidising agents. Examples of oxidising agents which may be used are nitric acid, gaseous chlorine, hypochlorite, gaseous bromine hypobromite, chlorate, bromate, iodate, hydrogen peroxide, cerium (IV) ions preferably as chloride. The quantity of oxidising agent should be sufficient to re-oxidise all of the iridium present in solution.

In stage (f) it is preferred to use the same nitrogen containing organic compound as is used in stage (c). This is not essential, however, and special factors may necessitate use of an alternative nitrogen containing compound. The same range of compounds as described above for stage (c) may be used. Similar procedures, e.g. multi-stage counter-current extraction, should also be used to ensure adequate contact between the two phases.

At stage (g), as before, physical methods can be used to separate the two phases after they have been allowed to come to equilibrium. If necessary more than one quantity of nitrogen containing organic compound may be used to contact the aqueous solution containing oxidised Ir and Rh. Alternatively the same quantity can be stripped of Ir and recycled.

Iridium may be stripped from the organic compound by the use of either acid or alkali in aqueous solution. Strong acids such as hydrochloric acids, nitric acid or perchloric acid may be used. Examples of alkalis which may be used as the stripping reagent are lithium, potassium and sodium hydroxide solutions, ammonium hydroxide solution and potassium and sodium carbonate and bicarbonate solutions. Moderately strong aqueous alkali solutions are preferred e.g. 5–20% by weight.

If alkali is used the iridium precipitates as hydroxide which may be redissolved in HCl and oxidised and the Ir precipitated as $(NH_4)_2IrCl_6$ with ammonium chloride. This can be calcined and reduced with hydrogen or the redissolved hydroxide precipitate may be re-oxidised and re-extracted with an amine or quaternary ammonium compound to give a higher degree of purity.

A shorter stripping route is to contact the organic phase obtained at stage (g) with an aqueous reducing solution e.g. aqueous solutions of sulphite, bisulphite, hyposulphite, metabisulphite and thiosulphate or containing dissolved $SO_2$. The reduced iridium is then stripped with 3–9 M HCl from which it can be recovered by known techniques or as described above.

The aqueous solution of $Na_3RhCl_6$ remaining from stage (g) contains substantially all of the rhodium originally present and this can be reduced to the metal with hydrazine under pressure. A higher degree of purity may be obtained by recrystallisation of $Na_3RhCl_6.12H_2O$ followed by reduction of the aqueous solution as described above.

The invention also includes platinum group metals obtained using the process according to the invention.

The process of the present invention lends itself to operation in a multi-stage counter-current extraction assembly and, accordingly, a further feature of the present invention includes the use of a counter-current extraction assembly for the separation of rhodium, platinum and iridium as described above.

Feed liquors can vary greatly in concentrations of all three platinum group metals. The example described below gives results obtained with a typical feed liquor.

EXAMPLE

The process of the present invention was used to separate and purify platinum group metals present in a feed liquor containing:

|  | grams/liter |
|---|---|
| Pt | 30 |
| Ir | 1 |
| Rh | 5 |
| Base metals | 1 |

Cu, Ni, Sn, Se were present as base metals and the pH of the feed liquor was approximately 3.

When carrying out the process of the invention using this feed liquor, the tertiary amine used at stages (c) and (f) was a water-insoluble straight chain, saturated tertiary amine $R_3N$. The alkyl groups R, were a $C_8$–$C_{10}$ mixture with the $C_8$ carbon chain predominating. Such a product is sold under the name Alamine 336 (Registered Trade Mark) by the General Mills Corporation, Minneapolis, U.S.A. A typical analysis of Alamine 336 is:

| | |
|---|---|
| Tertiary amine content | 95% |
| Secondary amine content | 1% |
| Primary amine content | 0.2% |
| Water content | Nil. |

A suitable solvent for Alamine 336 is Solvesso 150 (Registered Trade Mark, Esso Chemicals Ltd.) Strengths suitable for use in stages (c) and (f) above are within the range 5–20%, but in this Example 10% by weight for stage (c) 5% by weight for stage (f).

Using this compound we obtained separations of platinum, rhodium and iridium from each other (and from base metal present to the extent of 2.7% by weight) as well as purities of platinum, rhodium and iridium given in the table below indicating that the process of the invention is economically viable:

| % by weight recovery | | Purity (% by weight)* |
|---|---|---|
| Pt | 99.9 | 99.8 |
| Ir | 98.0 | 99.5 |
| Rh | 99.9 | 99.0 |

Further, it will be appreciated that these purity figures were obtained without the use of any extra step for removal of base metals from strip liquors.

What we claim is:

1. A process for the separation and purification of platinum, rhodium and iridium present as salts dissolved in aqueous solution comprising the steps of:
   a. contacting the solution at acid pH with a reducing agent to effect the reduction of iridium present as Ir(IV) to Ir(III);
   b. contacting the reduced solution with a nitrogen containing organic compound selected from the group consisting of secondary amines of the formula $R_2NH$, tertiary amines of the formula $R_3N$ and quaternary ammonium compounds of the formula $R_4NX$ wherein at least one R is an alkyl group, the remainder being alkyl or aryl, and X is a halide or hydroxide ion;
   c. removing from contact with the solution an organic phase containing substantially all of the platinum present in association with the nitrogen-containing organic compound used in step (b);
   d. re-oxidising iridium which with the rhodium remains in the aqueous phase from Ir(III) to Ir(IV);
   e. again contacting the oxidised solution with a fresh quantity of a nitrogen-containing organic compound selected from the group consisting of secondary amines of the formula $R_2NH$, tertiary amines of the formula $R_3N$ and quaternary ammonium compounds of the formula $R_4NX$ wherein at least one R is an alkyl group, the remainder being alkyl or aryl, and X is a halide or hydroxide ion;
   f. removing from contact with the reoxidised solution the organic phase containing substantially all of the iridium present in association with the nitrogen-containing organic compound used in step (e).

2. A process according to claim 1 in which the same nitrogen-containing compound is used in step (b) and in step (e).

3. A process according to claim 1 in which the nitrogen-containing organic compound used in step (b) is different from that used in step (e).

4. A process according to claim 1 in which the nitrogen-containing organic compound in step (b) is equilibrated with an acid before contacting with the acidic solution.

5. A process according to claim 1 in which the nitrogen-containing organic compound in step (e) is equilibrated with an acid before contacting with the acidic solution.

6. A process according to claim 1 wherein the pH of the solution is initially adjusted to give the acidic pH by the addition of hydrochloric acid.

7. A process according to claim 1 in which the nitrogen-containing organic compound in step (b) or in step (e) is a secondary amine of the formula $R_2NH$ where each R group is alkyl.

8. A process according to claim 7 in which the alkyl contains from 6 to 12 carbon atoms.

9. A process according to claim 7 in which the alkyl is selected from the group consisting of normal and iso hexyl, heptyl, octyl, nonyl, decyl, undecyl and dodecyl groups.

10. A process according to claim 9 in which the secondary amine is selected from the group consisting of N-dodecyl (trialkylmethyl) amine, N lauryl (trialkylmethyl) amine, di-n-hexyl amine, di-n-heptylamine, di-n-octylamine, di-n-nonylamine, di-n-decylamine, di-n-undecylamine and di-n-dodecylamine.

11. A process according to claim 1 in which the nitrogen-containing organic compound used in step (b) or in step (e) is a tertiary amine of the formula $R_3N$ where each R group is alkyl.

12. A process according to claim 11 in which the alkyl contains from 6 to 12 carbon atoms.

13. A process according to claim 12 in which the alkyl is selected from the group consisting of normal and iso hexyl, heptyl, octyl, nonyl, decyl, undecyl and dodecyl groups.

14. A process according to claim 13 in which the tertiary amine is selected from the group consisting of tri-n-hexylamine, methyl di-n-octylamine, tri-n-octylamine, tri-iso-octylamine, tri-n-heptylamine, tri-iso-heptylamine, tri-n-nonylamine and tri-iso-nonylamine.

15. A process according to claim 1 in which the nitrogen-containing organic compound in step (b) or step (e) is a tertiary amine of the formula $R_3N$ where at least one R group is alkyl and at least one of the other R groups is aromatic.

16. A process according to claim 1 in which the nitrogen-containing organic compound in step (b) or in step (e) is a quaternary ammonium compound of the general formula $R_4NX$.

17. A process according to claim 16 in which the quaternary ammonium compound is selected from the group consisting of phenyl trimethyl ammonium hydroxide, dimethyl octyl benzylammonium chloride, tetra octylammonium chloride and methyl tri-n-alkylammonium chloride where the alkyl contains predominantly 8 to 10 carbon atoms.

18. A process according to claim 1 in which the aqueous solution is acidified before step (a) to establish a hydrochloric acid strength within the range 3–9 molar.

19. A process according to claim 1 in which the reducing agent at step (a) is selected from the group consisting of sulphite, a carboxylate, sulphur dioxide, hydrazine, a ketone, an aldehyde, an alcohol and hydrogen.

20. A process according to claim 19 in which the carboxylate is selected from the group consisting of oxalate and formate.

21. A process according to claim 19 in which the ketone is acetone.

22. A process according to claim 19 in which the aldehyde is formaldehyde.

23. A process according to claim 19 in which the alcohol is ethanol.

24. A process according to claim 1 in which the organic phase removed in stage (c) is stripped of its platinum with an acid.

25. A process according to claim 24 in which the acid is a strong aqueous solution of an acid selected from the group consisting of hydrochloric acid, nitric acid and perchloric acid.

26. A process according to claim 24 in which the stripped platinum is reduced to the pure metal by a reducing agent selected from the group consisting of hydrazine and hydrogen under pressure.

27. A process according to claim 1 in which the organic phase removed in stage (c) is stripped of its platinum with an alkali.

28. A process according to claim 27 in which the stripped platinum is reduced to the pure metal by a reducing agent selected from the group consisting of hydrazine and hydrogen under pressure.

29. A process according to claim 27 in which the aqueous solution is one selected from the group consisting of lithium hydroxide, potassium hydroxide, sodium hydroxide, ammonium hydroxide, potassium carbonate, sodium carbonate, potassium bicarbonate and sodium bicarbonate.

30. A process according to claim 27 in which the alkali is an aqueous solution within the range 5 to 20% by weight.

31. A process according to claim 1 in which in step (d) any loss of acidity is restored before oxidation.

32. A process according to claim 1 in which the oxidising agent in step (d) is selected from the group consisting of gaseous chlorine, hypochlorite, gaseous bromine, hypobromite, chlorate, bromate, iodate, hydrogen peroxide and cerium (IV) ions.

33. A process according to claim 1 in which the organic phase removed in stage (f) is stripped of its iridium by contact with an aqueous solution containing a reagent selected from the group consisting of acids, alkalis and reducing agents.

34. A process according to claim 33 in which the acid is an aqueous solution of a strong acid selected from the group consisting of hydrochloric acid, nitric acid and perchloric acid.

35. A process according to claim 33 in which the alkali is selected from the group consisting of lithium hydroxide, potassium hydroxide, sodium hydroxide, ammonium hydroxide, potassium carbonate, sodium carbonate, potassium bicarbonate and sodium bicarbonate.

36. A process according to claim 35 in which the alkali is an aqueous solution within the range 5 to 20% by weight.

37. A process according to claim 33 in which the reducing agent is selected from the group consisting of sulphite, bisulphite, hyposulphite, metabisulphite, thiosulphate and dissolved $SO_2$.

38. A process according to claim 33 in which the alkali is used as the stripping agent and the precipitated hydrated oxide of iridium is re-dissolved in acid and reoxidised.

39. A process according to claim 38 in which the dissolved iridium is re-oxidised and re-extracted with a secondary or tertiary amine or quaternary ammonium compound.

40. A process according to claim 38 in which the dissolved iridium is recovered by precipitation as $(NH_4)_2IrCl_6$.

41. A process according to claim 40 in which $(NH_4)_2IrCl_6$ is ignited and reduced to the pure metal.

42. A process according to claim 41 in which the reduction is carried out by hydrogen.

43. A process according to claim 1 in which the rhodium present in the aqueous solution remaining after removal of the organic phase in step (f) is purified by precipitation and recrystallisation.

44. A process according to claim 43 in which the rhodium is precipitated as $Na_3RhCl_6 12H_2O$.

45. A process according to claim 44 in which rhodium metal is obtained by reduction of an aqueous solution of $Na_3RhCl_6$ with hydrazine on hydrogen under pressure.

46. A process according to claim 1 in which the rhodium present in the aqueous solution remaining after the removal of the organic phase in step (f) is reduced to rhodium metal by hydrazine or hydrogen under pressure.

47. A process according to claim 1 which operates by the use of multistage countercurrent solvent extraction.

48. A process according to claim 1 in which the tertiary amine is selected from the group consisting of triphenylamine, tribenzylamine, diphenylmethylamine, dimethylbenzylamine.

49. A process for the separation of salts of platinum, rhodium and iridium in aqueous solution comprising the steps of:
   a. acidifying the solution;
   b. contacting the acidified solution with a reducing agent to effect the reduction of Ir(IV) to Ir(III);
   c. contacting the solution with a tertiary amine $R_3N$ equilibrated with hydrochloric acid in which R is $C_8$–$C_{10}$ alkyl with normal $C_8$ alkyl predominating;
   d. removing from contact with the solution an organic phase containing substantially all of the platinum present in association with the tertiary amine;
   e. re-oxidising the iridium which with rhodium remains in the aqueous phase to Ir(IV);
   f. again contacting the oxidised solution with a fresh quantity of the above mentioned tertiary amine $R_3N$ in which R is $C_8$–$C_{10}$ alkyl with normal $C_8$ alkyl predominating; and
   g. removing from contact with the re-oxidised solution the organic phase containing substantially all of the iridium present in the form of iridate in association with the said tertiary amine.

* * * * *